United States Patent
Turley et al.

(10) Patent No.: US 8,397,282 B2
(45) Date of Patent: *Mar. 12, 2013

(54) DYNAMICALLY ADAPTIVE NETWORK FIREWALLS AND METHOD, SYSTEM AND COMPUTER PROGRAM PRODUCT IMPLEMENTING SAME

(75) Inventors: Patrick Turley, Austin, TX (US); Eric White, Austin, TX (US)

(73) Assignee: RPX Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/092,488

(22) Filed: Apr. 22, 2011

(65) Prior Publication Data

US 2011/0219444 A1    Sep. 8, 2011

Related U.S. Application Data

(63) Continuation of application No. 12/579,566, filed on Oct. 15, 2009, now Pat. No. 8,032,933, which is a continuation of application No. 11/076,719, filed on Mar. 10, 2005, now Pat. No. 7,610,621.

(60) Provisional application No. 60/551,698, filed on Mar. 10, 2004.

(51) Int. Cl.
    *H04L 29/00*    (2006.01)

(52) U.S. Cl. .......................................... 726/11

(58) Field of Classification Search ........................ None
See application file for complete search history.

(56) References Cited

U.S. PATENT DOCUMENTS

| | | | |
|---|---|---|---|
| 5,623,601 A | 4/1997 | Vu | |
| 5,673,393 A | 9/1997 | Marshall et al. | |
| 5,706,427 A | 1/1998 | Tabuki | |
| 5,748,901 A | 5/1998 | Afek et al. | |
| 5,835,727 A | 11/1998 | Wong et al. | |
| 5,878,231 A | 3/1999 | Baehr et al. | |
| 5,896,499 A | 4/1999 | McKelvey | |
| 5,901,148 A | 5/1999 | Bowen et al. | |
| 5,936,542 A | 8/1999 | Kleinrock et al. | |
| 5,953,506 A | 9/1999 | Kalra et al. | |
| 5,987,134 A | 11/1999 | Shin et al. | |
| 5,996,013 A | 11/1999 | Delp et al. | |
| 6,085,241 A | 7/2000 | Otis | |
| 6,088,451 A | 7/2000 | He et al. | |

(Continued)

FOREIGN PATENT DOCUMENTS

| | | |
|---|---|---|
| EP | 0 587 522 A2 | 3/1994 |
| WO | WO 01/77787 A3 | 10/2001 |

(Continued)

OTHER PUBLICATIONS

Notice of Allowance issued for U.S. Appl. No. 12/753,390, mailed Mar. 16, 2012, 9 pages.

(Continued)

*Primary Examiner* — Minh Dinh
(74) *Attorney, Agent, or Firm* — Howison & Arnott, L.L.P.

(57) ABSTRACT

A system, method, and computer program product for controlling data through a firewall which may be dynamically configurable. The method may comprise defining at least one node, wherein the at least one node is associated with two or more network interfaces; associating a set of firewall rules with the at least one node; receiving a packet at a first node of the at least one node; and accepting or denying the packet based on the set of firewall rules. The firewall rules include dynamic chains of rules having defined places where firewall rules may be dynamically inserted into or deleted from the firewall while the firewall is operating on one or more machines connected to network segments where the nodes reside.

35 Claims, 3 Drawing Sheets

U.S. PATENT DOCUMENTS

| | | | |
|---|---|---|---|
| 6,092,200 A | 7/2000 | Muniyappa et al. | |
| 6,108,782 A | 8/2000 | Fletcher et al. | |
| 6,130,892 A | 10/2000 | Short et al. | |
| 6,131,116 A | 10/2000 | Riggins et al. | |
| 6,157,953 A | 12/2000 | Chang et al. | |
| 6,173,331 B1 | 1/2001 | Shimonishi | |
| 6,176,883 B1 | 1/2001 | Holloway et al. | |
| 6,185,567 B1 | 2/2001 | Ratnaraj et al. | |
| 6,194,992 B1 | 2/2001 | Short et al. | |
| 6,199,113 B1 | 3/2001 | Alegre et al. | |
| 6,205,552 B1 | 3/2001 | Fudge | |
| 6,212,558 B1 | 4/2001 | Antur et al. | |
| 6,219,706 B1 | 4/2001 | Fan et al. | |
| 6,226,752 B1 | 5/2001 | Gupta et al. | |
| 6,233,607 B1 | 5/2001 | Taylor et al. | |
| 6,243,815 B1 | 6/2001 | Antur et al. | |
| 6,266,774 B1 | 7/2001 | Sampath et al. | |
| 6,275,693 B1 | 8/2001 | Lin et al. | |
| 6,295,294 B1 | 9/2001 | Odlyzko | |
| 6,321,339 B1 | 11/2001 | French et al. | |
| 6,324,648 B1 | 11/2001 | Grantges, Jr. | |
| 6,336,133 B1 | 1/2002 | Morris et al. | |
| 6,404,743 B1 | 6/2002 | Meandzija | |
| 6,421,319 B1 | 7/2002 | Iwasaki | |
| 6,463,474 B1 | 10/2002 | Fuh et al. | |
| 6,473,793 B1 | 10/2002 | Dillon et al. | |
| 6,473,801 B1 | 10/2002 | Basel | |
| 6,477,143 B1 | 11/2002 | Ginossar | |
| 6,502,131 B1 | 12/2002 | Vaid et al. | |
| 6,502,135 B1 | 12/2002 | Munger et al. | |
| 6,516,417 B1 | 2/2003 | Pegrum et al. | |
| 6,535,879 B1 | 3/2003 | Behera | |
| 6,539,431 B1 | 3/2003 | Sitaraman et al. | |
| 6,631,416 B2 | 10/2003 | Bendinelli et al. | |
| 6,636,894 B1 | 10/2003 | Short et al. | |
| 6,643,260 B1 | 11/2003 | Kloth et al. | |
| 6,678,733 B1 | 1/2004 | Brown et al. | |
| 6,708,212 B2 | 3/2004 | Porras et al. | |
| 6,732,179 B1 | 5/2004 | Brown et al. | |
| 6,735,691 B1 | 5/2004 | Capps et al. | |
| 6,757,740 B1 | 6/2004 | Parekh et al. | |
| 6,763,468 B2 | 7/2004 | Gupta et al. | |
| 6,785,252 B1 | 8/2004 | Zimmerman et al. | |
| 6,789,110 B1 | 9/2004 | Short et al. | |
| 6,789,118 B1 | 9/2004 | Rao | |
| 6,798,746 B1 | 9/2004 | Kloth et al. | |
| 6,804,783 B1 | 10/2004 | Wesinger et al. | |
| 6,816,903 B1 | 11/2004 | Rakoshitz et al. | |
| 6,823,385 B2 | 11/2004 | McKinnon et al. | |
| 6,834,341 B1 | 12/2004 | Bahl et al. | |
| 6,839,759 B2 | 1/2005 | Larson et al. | |
| 6,876,668 B1 | 4/2005 | Chawla et al. | |
| 6,907,530 B2 | 6/2005 | Wang | |
| 6,917,622 B2 | 7/2005 | McKinnon et al. | |
| 6,976,089 B2 | 12/2005 | Na et al. | |
| 6,996,625 B2 | 2/2006 | Kaplan et al. | |
| 7,013,331 B2 | 3/2006 | Das | |
| 7,085,385 B2 | 8/2006 | Frantz et al. | |
| 7,085,854 B2 | 8/2006 | Keane et al. | |
| 7,092,727 B1 | 8/2006 | Li et al. | |
| 7,120,934 B2 | 10/2006 | Ishikawa | |
| 7,143,283 B1 | 11/2006 | Chen et al. | |
| 7,143,435 B1 | 11/2006 | Droms et al. | |
| 7,146,639 B2 | 12/2006 | Bartal et al. | |
| 7,181,017 B1 | 2/2007 | Nagel et al. | |
| 7,181,542 B2 | 2/2007 | Tuomenoksa et al. | |
| 7,181,766 B2 | 2/2007 | Bendinelli et al. | |
| 7,185,073 B1 | 2/2007 | Gai et al. | |
| 7,185,358 B1 | 2/2007 | Schreiber et al. | |
| 7,185,368 B2 | 2/2007 | Copeland, III | |
| 7,188,180 B2 | 3/2007 | Larson et al. | |
| 7,194,554 B1 | 3/2007 | Short et al. | |
| 7,216,173 B2 | 5/2007 | Clayton et al. | |
| 7,257,833 B1 | 8/2007 | Parekh et al. | |
| 7,266,754 B2 | 9/2007 | Shah | |
| 7,272,646 B2 | 9/2007 | Cooper et al. | |
| 7,290,288 B2 | 10/2007 | Gregg et al. | |
| 7,310,613 B2 | 12/2007 | Briel et al. | |
| 7,316,029 B1 | 1/2008 | Parker et al. | |
| 7,324,551 B1 | 1/2008 | Stammers | |
| 7,324,947 B2 | 1/2008 | Jordan et al. | |
| 7,325,042 B1 | 1/2008 | Soscia et al. | |
| 7,386,888 B2 | 6/2008 | Liang et al. | |
| 7,406,530 B2 | 7/2008 | Brown et al. | |
| 7,418,504 B2 | 8/2008 | Larson et al. | |
| 7,420,956 B2 | 9/2008 | Karaoguz et al. | |
| 7,444,669 B1 | 10/2008 | Bahl et al. | |
| 7,448,075 B2 | 11/2008 | Morand et al. | |
| 7,454,792 B2 | 11/2008 | Cantrell et al. | |
| 7,490,151 B2 | 2/2009 | Munger et al. | |
| 7,509,625 B2 | 3/2009 | Johnston et al. | |
| 7,540,025 B2 * | 5/2009 | Tzadikario | 726/22 |
| 7,587,512 B2 | 9/2009 | Ta et al. | |
| 7,590,728 B2 | 9/2009 | Tonnesen et al. | |
| 7,610,621 B2 | 10/2009 | Turley et al. | |
| 7,624,438 B2 | 11/2009 | White | |
| 7,634,805 B2 * | 12/2009 | Aroya | 726/13 |
| 7,665,130 B2 | 2/2010 | Johnston et al. | |
| 7,836,496 B2 * | 11/2010 | Chesla et al. | 726/13 |
| 8,032,933 B2 | 10/2011 | Turley et al. | |
| 8,108,915 B2 | 1/2012 | White et al. | |
| 8,117,639 B2 | 2/2012 | MacKinnon et al. | |
| 8,224,983 B2 | 7/2012 | Ta et al. | |
| 2001/0038639 A1 | 11/2001 | McKinnon et al. | |
| 2001/0038640 A1 | 11/2001 | McKinnon et al. | |
| 2001/0038645 A1 | 11/2001 | McKinnon et al. | |
| 2001/0039576 A1 | 11/2001 | Kanada | |
| 2001/0039582 A1 | 11/2001 | McKinnon et al. | |
| 2002/0013844 A1 | 1/2002 | Garrett et al. | |
| 2002/0021665 A1 | 2/2002 | Bhagavath et al. | |
| 2002/0023160 A1 | 2/2002 | Garrett et al. | |
| 2002/0023210 A1 | 2/2002 | Tuomenoksa et al. | |
| 2002/0026503 A1 | 2/2002 | Bendinelli et al. | |
| 2002/0026531 A1 | 2/2002 | Keane et al. | |
| 2002/0029260 A1 | 3/2002 | Dobbins et al. | |
| 2002/0029276 A1 | 3/2002 | Bendinelli et al. | |
| 2002/0035699 A1 | 3/2002 | Crosbie | |
| 2002/0042883 A1 | 4/2002 | Roux et al. | |
| 2002/0046264 A1 | 4/2002 | Dillon et al. | |
| 2002/0052950 A1 | 5/2002 | Pillai et al. | |
| 2002/0053031 A1 | 5/2002 | Bendinelli et al. | |
| 2002/0055968 A1 | 5/2002 | Wishoff et al. | |
| 2002/0056008 A1 | 5/2002 | Keane et al. | |
| 2002/0059408 A1 | 5/2002 | Pattabhiraman et al. | |
| 2002/0075844 A1 | 6/2002 | Hagen | |
| 2002/0083175 A1 * | 6/2002 | Afek et al. | 709/225 |
| 2002/0085719 A1 | 7/2002 | Crosbie | |
| 2002/0087713 A1 | 7/2002 | Cunningham | |
| 2002/0090089 A1 | 7/2002 | Branigan | |
| 2002/0091859 A1 | 7/2002 | Tuomenoksa et al. | |
| 2002/0091944 A1 | 7/2002 | Anderson et al. | |
| 2002/0099829 A1 | 7/2002 | Richards et al. | |
| 2002/0112183 A1 | 8/2002 | Baird, III et al. | |
| 2002/0112186 A1 | 8/2002 | Ford et al. | |
| 2002/0120741 A1 | 8/2002 | Webb et al. | |
| 2002/0123335 A1 | 9/2002 | Luna et al. | |
| 2002/0124078 A1 | 9/2002 | Conrad | |
| 2002/0124103 A1 | 9/2002 | Maruyama et al. | |
| 2002/0129143 A1 | 9/2002 | McKinnon, III et al. | |
| 2002/0131404 A1 | 9/2002 | Mehta et al. | |
| 2002/0133581 A1 | 9/2002 | Schwartz et al. | |
| 2002/0133586 A1 | 9/2002 | Shanklin et al. | |
| 2002/0133589 A1 | 9/2002 | Gubbi et al. | |
| 2002/0136226 A1 | 9/2002 | Christoffel et al. | |
| 2002/0138631 A1 | 9/2002 | Friedel et al. | |
| 2002/0138762 A1 | 9/2002 | Horne | |
| 2002/0138763 A1 | 9/2002 | Delany et al. | |
| 2002/0143964 A1 | 10/2002 | Guo et al. | |
| 2002/0152284 A1 | 10/2002 | Cambray et al. | |
| 2002/0162030 A1 | 10/2002 | Brezak et al. | |
| 2002/0164952 A1 | 11/2002 | Singhal et al. | |
| 2002/0165949 A1 | 11/2002 | Na et al. | |
| 2002/0165990 A1 | 11/2002 | Singhal et al. | |
| 2002/0169867 A1 | 11/2002 | Mann et al. | |
| 2002/0174227 A1 | 11/2002 | Hartsell et al. | |
| 2002/0178282 A1 | 11/2002 | Mysore et al. | |
| 2002/0199007 A1 | 12/2002 | Clayton et al. | |

| | | | | | | |
|---|---|---|---|---|---|---|
| 2003/0041104 | A1 | 2/2003 | Wingard et al. | 2008/0276305 A1 | 11/2008 | Chan et al. |
| 2003/0043846 | A1 | 3/2003 | Purpura et al. | 2009/0279567 A1 | 11/2009 | Ta et al. |
| 2003/0046370 | A1 | 3/2003 | Courtney | 2010/0064356 A1 | 3/2010 | Johnston et al. |
| 2003/0055994 | A1 | 3/2003 | Herrmann et al. | 2010/0192213 A1 | 7/2010 | Ta et al. |
| 2003/0059038 | A1 | 3/2003 | Meyerson et al. | 2011/0258687 A1 | 10/2011 | White et al. |
| 2003/0061506 | A1 | 3/2003 | Cooper | 2012/0096517 A1 | 4/2012 | White et al. |
| 2003/0069955 | A1 | 4/2003 | Gieseke et al. | 2012/0117615 A1 | 5/2012 | MacKinnon et al. |
| 2003/0069956 | A1 | 4/2003 | Gieske et al. | | | |
| 2003/0070170 | A1 | 4/2003 | Lennon | | | |

FOREIGN PATENT DOCUMENTS

| | | |
|---|---|---|
| WO | WO 02/09458 A2 | 1/2002 |
| WO | WO 02/23825 A1 | 3/2002 |
| WO | WO 02/41587 A2 | 5/2002 |
| WO | WO 02/077820 A1 | 10/2002 |
| WO | WO 03/021890 A1 | 3/2003 |
| WO | WO 03/098461 A1 | 11/2003 |
| WO | WO 2004/034229 A2 | 4/2004 |
| WO | WO 2004/036371 A2 | 4/2004 |
| WO | WO 2005/020035 A2 | 3/2005 |

| | | | |
|---|---|---|---|
| 2003/0078784 | A1 | 4/2003 | Jordan et al. |
| 2003/0087629 | A1 | 5/2003 | Juitt et al. |
| 2003/0110073 | A1 | 6/2003 | Briel et al. |
| 2003/0115247 | A1 | 6/2003 | Simpson et al. |
| 2003/0123442 | A1 | 7/2003 | Drucker et al. |
| 2003/0126608 | A1 | 7/2003 | Safadi et al. |
| 2003/0135753 | A1 | 7/2003 | Batra et al. |
| 2003/0149751 | A1 | 8/2003 | Bellinger et al. |
| 2003/0154399 | A1 | 8/2003 | Zuk |
| 2003/0159072 | A1 | 8/2003 | Bellinger et al. |
| 2003/0163603 | A1 | 8/2003 | Fry et al. |
| 2003/0172167 | A1 | 9/2003 | Judge et al. |
| 2003/0177477 | A1 | 9/2003 | Fuchs |
| 2003/0182420 | A1 | 9/2003 | Jones et al. |
| 2003/0212800 | A1 | 11/2003 | Jones et al. |
| 2003/0212900 | A1 | 11/2003 | Liu et al. |
| 2003/0217126 | A1 | 11/2003 | Polcha et al. |
| 2004/0015719 | A1 | 1/2004 | Lee |
| 2004/0047356 | A1 | 3/2004 | Bauer |
| 2004/0049586 | A1 | 3/2004 | Ocepek et al. |
| 2004/0064351 | A1 | 4/2004 | Mikurak |
| 2004/0064560 | A1 | 4/2004 | Zhang et al. |
| 2004/0064836 | A1 | 4/2004 | Ludvig et al. |
| 2004/0073941 | A1 | 4/2004 | Ludvig et al. |
| 2004/0083295 | A1 | 4/2004 | Amara et al. |
| 2004/0085906 | A1 | 5/2004 | Ohtani |
| 2004/0093513 | A1 | 5/2004 | Cantrell |
| 2004/0103426 | A1 | 5/2004 | Ludvig et al. |
| 2004/0107290 | A1 | 6/2004 | Kaplan et al. |
| 2004/0122956 | A1 | 6/2004 | Myers et al. |
| 2004/0172557 | A1 | 9/2004 | Nakae et al. |
| 2004/0177276 | A1 | 9/2004 | MacKinnon et al. |
| 2004/0179822 | A1 | 9/2004 | Tsumagari et al. |
| 2004/0181816 | A1 | 9/2004 | Kim et al. |
| 2004/0199635 | A1 | 10/2004 | Ta et al. |
| 2004/0210633 | A1 | 10/2004 | Brown et al. |
| 2004/0215957 | A1 | 10/2004 | Moineau et al. |
| 2004/0236963 | A1* | 11/2004 | Danford et al. ............. 713/201 |
| 2004/0268149 | A1 | 12/2004 | Aaron |
| 2004/0268234 | A1 | 12/2004 | Sampathkumar et al. |
| 2005/0021686 | A1 | 1/2005 | Jai et al. |
| 2005/0021975 | A1 | 1/2005 | Liu |
| 2005/0044350 | A1 | 2/2005 | White et al. |
| 2005/0044422 | A1 | 2/2005 | Cantrell |
| 2005/0066200 | A1 | 3/2005 | Bahl et al. |
| 2005/0091303 | A1 | 4/2005 | Suzuki |
| 2005/0138358 | A1 | 6/2005 | Bahl et al. |
| 2005/0138416 | A1 | 6/2005 | Qian et al. |
| 2005/0149721 | A1 | 7/2005 | Lu |
| 2005/0193103 | A1 | 9/2005 | Drabik |
| 2005/0195854 | A1 | 9/2005 | Agmon et al. |
| 2005/0204022 | A1 | 9/2005 | Johnston et al. |
| 2005/0204031 | A1 | 9/2005 | Johnston et al. |
| 2005/0204050 | A1 | 9/2005 | Turley |
| 2005/0204168 | A1 | 9/2005 | Johnston et al. |
| 2005/0204169 | A1 | 9/2005 | Tonnesen |
| 2005/0204402 | A1 | 9/2005 | Turley et al. |
| 2006/0036723 | A1 | 2/2006 | Yip et al. |
| 2006/0168229 | A1 | 7/2006 | Shim et al. |
| 2006/0168454 | A1 | 7/2006 | Venkatachary et al. |
| 2006/0173992 | A1 | 8/2006 | Weber et al. |
| 2006/0184618 | A1 | 8/2006 | Kurup et al. |
| 2007/0073718 | A1 | 3/2007 | Ramer et al. |
| 2007/0186113 | A1 | 8/2007 | Cuberson et al. |
| 2007/0208936 | A1 | 9/2007 | Ramos Robles |
| 2007/0268878 | A1 | 11/2007 | Clements |
| 2008/0066096 | A1 | 3/2008 | Wollmershauser et al. |
| 2008/0098464 | A1 | 4/2008 | Mizrah |
| 2008/0120661 | A1 | 5/2008 | Ludvig et al. |
| 2008/0147840 | A1 | 6/2008 | Roelens et al. |

OTHER PUBLICATIONS

Office Action for U.S. Appl. No. 12/619,560, mailed May 9, 2012, 7 pgs.

Bauer, Mick, Designing and Using DMZ Networks to Protect Internet Servers, Linux Journal, Mar. 1, 2001, 6 pgs. at http://linuxjournal.com/article/4415, printed Mar. 22, 2012.

Notice of Allowance for U.S. Appl. No. 12/579,566, mailed Aug. 26, 2011, 9 pgs.

Alshamsi, Abdelnasir, et al., "A Technical Comparison of IPSec and SSL," Tokyo University of Technology, Jul. 8, 2004, 10 pages.

Fisher, Dennis, "NetScreen to Acquire Neoteris," IT Security & Network Security News, Oct. 6, 2003, 1 page.

Demaria, Mike, "Faster Than a Speeding VPN—Super Remote Access With Neoteris IVE," Network Computing, Sep. 9, 2002, printed Nov. 9, 2011 from http://www.networkcomputing.com/data-protection/2296249, 3 pages.

Snyder, Joel, "SSL VPN Gateways," Networkworld, Jan. 12, 2004, printed Nov. 9, 2011 from http://www.networkworld.com/reviews/2004/0112revmain.html, 10 pages.

"NetExtender for SSL-VPN," SonicWALL SSL-VPN NetExtender, Apr. 27, 2006, 30 pages.

"IPSec vs. SSL VPN: Transition Criteria and Methodology," 2007 Sonicwall, 13 pages.

Fisher, Dennis, "Symantec Acquires SSL VPN Vendor," IT Security & Network Security News, Oct. 20, 2003, printed Nov. 9, 2011 from http://www.eweek.com/index2.php?option=content& task=v . . . 1 page.

Notice of Allowance issued in U.S. Appl. No. 12/617,211, mailed Nov. 10, 2011, 8 pages.

Notice of Allowance issued in U.S. Appl. No. 10/683,317, mailed Nov. 28, 2011, 11 pages.

"Boingo Wireless Service Installed at LaGuardia Airport," Jun. 17, 2003, Copyright 2003 M2Communications Ltd., found at www.findarticles.com, Dec. 8, 2003, 1 pg.

"West Point Unwired: the Military Academy at West Point Continues to Lead the Way in High-Tech Curriculum with Wireless Classroom Networking," Communication News, Jun. 2003, Copyright 2003 M2 Communications Ltd., found at www.findarticles.com, 5 pgs., printed Dec. 8, 2003.

Molta, Dave, "Wireless Hotspots Heat Up," Mobile & Wireless Technology, pp. 1-8, May 15, 2003, Copyright 2003 M2Communications Ltd., found at www.networkcomputing.com, printed Dec. 8, 2003, 8 pgs.

Jackson, William, "Wireless at West Point: Officers of the Future Use IT in Class Now, in the Field Later (Technology Report)," Apr. 21, 2003, GCN, pp. 1-3, www.gcn.com.

Lingblom, Marie, Cranite Develops SMB Strategy, CRN, San Jose, CA, Jun. 23, 2003, 2 pgs.

Dornan, Andy "Wireless LANs: Freedom vs. Security?" Network Magazine, Jul. 2003, pp. 36-39, www.networkmagazine.com.

O'Shea, Dan, "PCTEL looks past patent suit toward fusion of Wi-Fi, PC" Telephony.online, Jun. 2, 2003, pp. 1-2, found at www.telephonyonline.com, Primedia Business Magazines and Media, printed Dec. 8, 2003.

O'Shea, Dan, "Boingo to Launch Initiative Aimed at Carrier Market" Telephony.online, Mar. 10, 2003, 1 pg., found at www.telephonyonline.com, Primedia Business Magazines and Media, printed Dec. 8, 2003.

International Search Report for International Patent Application No. PCT/US03/32912, completed Mar. 22, 2004, mailed Apr. 8, 2004, 6 pgs.

International Search Report for International Patent Application No. PCT/US03/32268, completed Oct. 17, 2004, mailed Oct. 29, 2004, 6 pgs.

Fan, Chen, et al, "Distributed Real Time Intrusion Detection System for 3G," Proceedings of ICCC2004, 2004, pp. 1566-1570.

Yu, Zhao-xu et al., "Fuzzy Logic Based Adaptive Congestion Control Scheme for High-Speed Network," vol. 33, No. 4, Information and Control, Aug. 2004, pp. 389-393 (with English abstract).

Hamano, Takafumi et al., "A Redirection-Based Defense Mechanism Against Flood-Type Attacks in Large Scale ISP Networks," 10th Asia-Pacific Conf. On Comm. and 5th Int'l Symposium on Multi-Dimensional Mobile Comm., 2004, pp. 543-547, IEEE #07803-8601-09/04.

Sarolahti, Pasi, "Congestion Control on Spurious TCP Retransmssion Timeouts," Globecom 2003, pp. 682-686, IEEE #0-7803-7974-8.

Estevez-Tapiador, Juan M., et al., "Measuring Normality in HTTP Traffic for Anomaly-Based Intrusion Detection," Computer Networks 45 (2004), pp. 175-193, available at www.sciencedirect.com, El Sevier 2004 #13891286.

Xing, Xu-Jia, et al., "A Survey of Computer Vulnerability Assessment," Chinese Journal of Computers, vol. 27, No. 1, Jan. 2004, pp. 1-11 (with English abstract).

Wen et al. "Development of a Snort-Based Security Network Management and Real-Time Intrusion Detection System," Journal of Beijing Normal Univ. (Natural Science), vol. 40, No. 1, Feb. 2004, pp. 40-43 (with English abstract).

Thottethodi, Methune, et al., "Exploiting Global Knowledge to Achieve Self-Tuned Congestion Control for k-Ary n-Cube Networks," IEEE Transactions on Parallel and Distributed Systems, vol. 15, No. 3, Mar. 2004, pp. 257-272, IEEE #1045-9219/04.

Trabelsi, Zouheir, et al., "Malicious Sniffing Systems Detection Platform," 2004 IEEE, pp. 201-207, IEEE #0-7695-2068-5/04.

Guangzhi, Qu, et al., "A Framework for Network Vulnerability Analysis," Proceedings of the IASTED Int'l Conf., Comm., Internet & Information Tech., Nov. 18-20, 2004, St. Thomas, US Virgin Islands, pp. 289-294.

Albuquerque, Celio, et al., "Network Border Patrol: Preventing Congestion Collapse and Promoting Fairness in the Internet," IEEE/ACM Transactions on Networking, vol. 12, No. 1, Feb. 2004, pp. 173-186, IEEE #1063-6692/04.

Wirbel, Loring, "Security Stampede Could Flatten IPSec," Network Magazine, Jan. 2004, p. 12, available at www.networkmagazine.com.

Macleod, Calum, "Freeing the Shackles with Secure Remote Working," Comtec, Oct. 2003, pp. 66-67.

Fisher, Dennis, "SSL Simplifies VPN Security," IT Week, Nov. 10, 2003, p. 40, available at www.eweek.com/security.

Conry-Murray, Andrew, "SSL VPNs: Remote Access for the Masses," Network Magazine, Oct. 2003, pp. 26-32, available at www.networkmagazine.com.

"Permeo Supports Microsoft Network Access Protection for Simplified Secure Remote Access; Permeo's Base5 Support of Microsoft Technology Provides "Zero Touch" Policy Enforcement", Apr. 25, 2005, 2 pgs., Newswire, found at www.nerac.com. #NDN-121-0552-8254-9.

Permeo Drives Out Operational Costs, Simplifies Secure Remote Access, Mar. 25, 2005, 2 pgs., Newswire, found at www.nerac.com. #NDN-121-0549-5967-5.

"Netilla Lauches SSL VPN for Citrix. (Industry Briefs) (Virtual Private Networks) (Brief Article)," Sep. 20, 2004, 2 pgs., Computer Reseller News, found at www.nerac.com. #NDN-218-0991-7652-9.

"Netilla Lauches Secure Gateway Appliance Family of Application-Specific SSL VPN Products; Initial SGA-C Model Provides Secure Remote Access to Citrix MetaFrame Presentation Server Installations . . . " Sep. 13, 2004, 3 pgs., PR Newswire, found at www.nerac.com. #NDN-218-0987-0667-2.

"Secure Remote Access.(Network Security) (VPN Gateway 4400 Series) (Brief Article)," Mar. 1, 2004, 2 pgs., Communication News, vol. 41, found at www.nerac.com. #NDN-218-0925-2711-6.

"Fortinet and Aventail Deliver Joint Solution for Clientless Remote Access with High-Performance Antivirus Protection; Integrated SSL VPN and Antivirus Offering Provides Clientless Remote Access with Complete Content Security", Jan. 5, 2004, 3 pgs., PR Newswire, found at www.nerac.com. #NDN-218-0845-8319-2.

Hamblen, Matt, "Cisco Targets SSL VPN Vendors, Adds Support for Clientless Security Protocol: Installed Base of VPN Devices May Give it an Edge, Despite Late Entry," Nov. 17, 2003, 3 pgs., Computerworld, vol. 37, No. 46, found at www.nerac.com. #NDN-218-0841-5076-0.

Hamzeh, K., et al., "Point-to-Point Tunneling Protocol—PPTP RFC 2637" Network Working Groups, Jul. 1999, pp. 1-54, Microsoft Corporation.

International Search Report and Written Opinion for International Patent Application No. PCT/US04/29249, completed Nov. 28, 2005, mailed Dec. 15, 2005, 10 pgs.

Pfleeger, Charles P., Computer Network Security, Security in Computing, 1989, pp. 364-415, Ch. 10, PTR Prentice-Hall, Inc., Englewood Cliffs, NJ.

Office Action for U.S. Appl. No. 10/922,041, mailed Jul. 13, 2007, 20 pgs.

Stone, David, "Securing Wireless LANs with VPN", Intel Information Technology White Paper, Intel Corp., May 2006, 8 pgs. Order N#313185-001US.

Office Action for U.S. Appl. No. 10/683,317, mailed Oct. 9, 2007, 20 pgs.

Office Action for U.S. Appl. No. 10/687,002, mailed Oct. 18, 2007, 10 pgs.

Office Action for U.S. Appl. No. 11/078,223, mailed Oct. 31, 2007, 8 pgs.

Office Action for U.S. Appl. No. 11/076,652, mailed Jan. 25, 2008, 9 pgs.

Office Action for U.S. Appl. No. 10/687,002, mailed Apr. 17, 2008, 12 pgs.

Office Action for U.S. Appl. No. 10/683,317, mailed Jun. 9, 2008, 15 pgs.

Office Action for U.S. Appl. No. 11/076,672, mailed Jul. 9, 2008, 12 pgs.

Office Action for U.S. Appl. No. 11/076,652, mailed Jul. 22, 2008, 8 pgs.

Office Action for U.S. Appl. No. 11/076,591, mailed Aug. 13, 2008, 10 pgs.

Office Action for U.S. Appl. No. 11/076,719, mailed Sep. 4, 2008, 7 pgs.

SBC Technology Resources, Inc., XNMP-XML Network Management Protocol and Interface, Jul. 19, 2002, pp. 1-9, http://www.ietf.org/proceedings/02jul/slides.

Shim, Choon B., " XNMP for IP Telephony Management," Enterprise Networks & Servers, Jun. 2, 2006, 7 pgs.

Office Action for U.S. Appl. No. 11/076,652, mailed Dec. 11, 2008, 8 pgs.

Office Action for U.S. Appl. No. 10/687,002, mailed Jan. 7, 2009, 14 pgs.

Office Action for U.S. Appl. No. 11/076,672, mailed Feb. 3, 2009, 10 pgs.

Oh, et al., "Interaction Translation Methods for XML/SNMP Gateway," Jul. 11, 2003, retrieved from http://web-archive.org/web.20030711162412/http://dpnm.postech.ac.kr/papers/DSOM/02/xml-snmp-gateway/xml-snmp-gateway.pdf, pp. 1-12.

Office Action for U.S. Appl. No. 10/683,317, mailed Feb. 11, 2009, 17 pgs.

Office Action for U.S. Appl. No. 11/076,591, mailed Feb. 13, 2009, 26 pgs.

International Preliminary Report on Patentability for International Patent Application No. PCT/US03/032268 completed Jan. 4, 2005, 3 pgs.

International Preliminary Report on Patentability for International Patent Application No. PCT/US03/032912 completed Jun. 28, 2004, 3 pgs.
International Preliminary Report on Patentability (Ch. I) of the International Searching Authority for International Patent Application No. PCT/US04/029249 issued Feb. 21, 2006, 6 pgs.
Office Action for U.S. Appl. No. 11/076,719, mailed Mar. 17, 2009, 8 pgs.
Office Action for U.S. Appl. No. 10/922,041, mailed Dec. 6, 2005, 10 pgs.
Office Action for U.S. Appl. No. 10/922,041, mailed Mar. 30, 2006, 18 pgs.
Office Action for U.S. Appl. No. 10/922,041, mailed Aug. 11, 2006, 19 pgs.
Office Action for U.S. Appl. No. 10/922,041, mailed Jan. 30, 2007, 20 pgs.
Office Action for U.S. Appl. No. 10/683,317, mailed Apr. 5, 2007, 6 pgs.
Office Action for U.S. Appl. No. 10/687,002, mailed May 2, 2007, 10 pgs.
Office Action for U.S. Appl. No. 10/922,041, mailed May 8, 2009, 13 pgs.
Office Action for U.S. Appl. No. 11/076,672, mailed Jul. 21, 2009, 11 pgs.
Notice of Allowability for U.S. Appl. No. 11/076,646, mailed Jul. 24, 2009, 7 pgs.
Crandell et al., "A Secure and Transparent Firewall Web Proxy," Oct. 2003, USENIX, Retrieved from the internet on Jul. 15, 2009: <URL: http://www.usenix.org/event/lisa03/tech/full_papers/crandell/crandell.pdf>.
Sommerlad, "Reverse Proxy Patterns," 2003 Retrieved from the Internet on Jul. 15, 2009, 27 pages; <URL: http://www.modsecurity.org/archive/ReverseProxy-book-1.pdf>.
Office Action for U.S. Appl. No. 11/076,591, mailed Aug. 6, 2009, 29 pgs.
Office Action for U.S. Appl. No. 10/683,317, mailed Aug. 18, 2009, 17 pgs.
Rashti et al, "A Multi-Dimensional Packet Classifier for NP-Based Firewalls," Proceedings of the 2004 Int'l Symposium on Applications and the Internet, Jan. 2004, 5 pages, from the internet, printed Aug. 12, 2009: <URL: http://ieeexplore.ieee.org/stamp/stamp.jsp?tp=&arnumber=1266123&isnumber=28312>.
Williamson, Matthew, "Throttling Viruses: Restricting Propagation to Defeat Malicious Mobile Code," Proceedings of the 18th Annual Computer Security Applications Conference, 2002 IEEE, 8 pages.
Williamson, et al, "Virus Throttling," Virus Bulletin Research Feature 1, Mar. 2003, 4 pgs.
Office Action for U.S. Appl. No. 11/076,672, mailed Jan. 7, 2010, 9 pgs.
Office Action for U.S. Appl. No. 11/076,591, mailed Feb. 2, 2010, 34 pgs.
Office Action for U.S. Appl. No. 11/076,591, mailed Jul. 20, 2010, 33 pgs.
Office Action for U.S. Appl. No. 10/683,317, mailed Jul. 23, 2010, 9 pgs.
Office Action for U.S. Appl. No. 12/506,140, mailed Sep. 1, 2010, 11 pgs.
"Discussion of Conceptual Difference Between Cisco IOS Classic and Zone-Based Firewalls," Oct. 2007, Cisco Systems, Inc., San Jose, CA, 4 pgs.
Cisco IOS Firewall Zone-Based Policy Firewall, Release 12.4(6)T, Technical Discussion, Feb. 2006, 77 pgs., Cisco Systems, Inc., San Jose, CA.
Zone-Based Policy Firewall Design and Application Guide, Document ID: 98628, Sep. 13, 2007, 49 pgs., Cisco Systems, Inc., San Jose, CA.
SP Maj, W Makairanondh, D Veal, "An Evaluation of Firewall Configuration Methods," IJSCSNS International Journal of Computer Science and Network Security, vol. 10, No. 8, Aug. 2010, 7 pgs.
Using VPN with Zone-Based Policy Firewall, May 2009, Cisco Systems, Inc., San Jose, CA, 10 pgs.

Cisco IOS Firewall Classic and Zone-Based Virtual Firewall Application Configuration Example, Document ID: 100595, Feb. 12, 2008, 20 pgs., Cisco Systems, Inc., San Jose, CA.
Class-Based Policy Provisioning: Introducing Class-Based Policy Language (CPL), Aug. 2008, 36 pgs., Cisco Systems, Inc., San Jose, CA.
Cisco IOS Zone Based Firewall Example, at http://www.linickx.com/archives/2945/cisco-ios-zon . . . , printed Dec. 7, 2010, 6 pgs., LINICKX.com.
Zone-Based Policy Firewall, Published Feb. 22, 2006, Updated Jun. 19, 2006, 46 pgs., Cisco Systems, Inc., San Jose, CA.
Applying Zone-based Firewall Policies in Cisco Security Manager, Published Mar. 2009, Revised Sep. 2009, Cisco Systems, Inc., San Jose, CA.
"FreeBSD Handbook, Chapter 30 Firewalls," 2003, found at www.freebsd.org/doc/handbook/firewalls-ipfw.html, printed Dec. 27, 2010, 13 pgs.
Watters, Paul, "Solaris 8 Administrator's Guide, Chapter 4, Network Configuration," O'Reilly & Associates, Inc., Jan. 2002, 17 pgs.
Spitzner, Lance, "Configuring network interface cards; getting your interfaces to talk," Mar. 23, 2004, 4 pgs.
Gite, Vivek, "Redhat/CentOS/Fedora Linux Open Port," Sep. 13, 2007, found at www.cyberciti.biz/faq/howto-rhel-linux-open-port-using-iptables/ printed Jan. 3, 2011, 7 pgs.
Office Action for U.S. Appl. No. 10/683,317, mailed Jan. 3, 2011, 12 pgs.
Office Action for U.S. Appl. No. 12/617,211, mailed Feb. 3, 2011, 14 pgs.
"Managing Firewall Services," User Guide for Cisco Security Manager 3.3.1, Oct. 2009, Ch. 11, 90 pgs., Cisco Systems, Inc., San Jose, CA.
"Cisco Common Classification Policy Language," Cisco Router and Security Device Manager 2.4 User's Guide, Ch. 34, 2007, 32 pgs., Cisco Systems, Inc., San Jose, CA.
Guide to User Documentation for Cisco Security Manager 4.0, Jun. 18, 2010, Cisco Systems, Inc., San Jose, CA.
Cisco Configuration Professional: Zone-Based Firewall Blocking Peer to Peer Traffic Configuration Example, Document ID: 112237, Updated Dec. 3, 2010, 25 pgs., Cisco Systems, Inc., San Jose, CA.
Tuning Cisco IOS Classic and Zone-Based Policy Firewall Denial-of-Service Protection, 2006, 10 pgs., Cisco Systems, Inc., San Jose, CA.
Holuska, Marty, Using Ciscos IOS Firewalls to Implement a Network Security Policy, Fort Hays State University/INT 490, printed Dec. 6, 2010, 5 pgs., http://quasarint.com/Capstone/zb_policy.php.
Cisco Feature Navigator, Cisco Systems, Inc., San Jose, CA, printed on Dec. 2, 2010, 4 pgs., at http://tools.cisco.com/ITDIT/CFN/Dispatch.
Office Action for U.S. Appl. No. 12/506,140, mailed Feb. 18, 2011, 13 pgs.
Office Action for U.S. Appl. No. 12/617,211, mailed Jul. 19, 2011, 18 pgs.
Office Action for U.S. Appl. No. 12/506,140, mailed Aug. 4, 2011, 18 pgs.
Office Action for U.S. Appl. No. 12/753,390, mailed Dec. 8, 2011, 19 pgs.
Notice of Allowance for U.S. Appl. No. 12/617,211, mailed Dec. 12, 2011, 8 pgs.
Office Action for U.S. Appl. No. 12/579,566, mailed Oct. 6, 2010, 7 pgs.
Notice of Allowance for U.S. Appl. No. 12/579,566, mailed Mar. 23, 2011, 12 pgs.
Notice of Allowance for U.S. Appl. No. 12/579,566, mailed May 13, 2011, 8 pgs.
Office Action for U.S. Appl. No. 10/683,317, mailed Jun. 8, 2011, 15 pgs.
Office Action for U.S. Appl. No. 13/173,764, mailed Jul. 17, 2012, 15 pgs.

* cited by examiner

```
(A) FROM FIG. 2A
+- :M -+   [Only the sub-trees that apply]
|  ↑   |
|  )   +- :M:A:Global
| 204  |
|      +- :M:A:Node ---+
|                      +- :M:A:Node:Null
|                      +- :M:A:Node:firewall
|                      +- :M:A:Node:Clients  => :X:ClientPortBlock:Drop
|                      |                     => :X:WalledGarden:Accept
|                      +- :M:A:Node:VPN
|                      +- :M:A:Node:WAN
|
|      +- :M:X:Fromfirewall -+
|                            +- :M:X:firewall-x-Clients
|                            +- :M:X:firewall-x-VPN  => :X:VPNSubnet:Fromfirewall:Pass
|                            +- :M:X:firewall-x-WAN
|
|      +- :M:X:Tofirewall ---+
|                            +- :M:X:Clients-x-firewall  => :X:Clients:Tofirewall:Accept
|                            |                           +=> :X:Abd:ClientsTofirewall:Uni:Pass
|                            |                           +=> :X:Abd:ClientsTofirewall:Ulog
|                            +- :M:X:VPN-x-firewall      => :X:VPNSubnet:Tofirewall:Pass
|                            +- :M:X:WAN-x-firewall      => :X:WAN:Tofirewall:Accept
|
|      +- :M:X:Clients-x-VPN  => :X:VPNSubnet:FromClients:Pass
|                             => :X:ClientMark:VPN:Accept
|
|      +- :M:X:Clients-x-WAN  => :X:ClientMark:WAN:Accept
|
|      +- :M:X:VPN-x-Clients  => :X:VPNSubnet:ToClients:Pass
|
|      +- :M:X:VPN-x-WAN
|
|      +- :M:X:WAN-x-Clients  => :X:Network:Accept
|                             => :X:PortForwarding:Accept
|                             => :X:PortXlation:Accept
|
|      +- :M:X:WAN-x-VPN
|
|      +- :M:D:Global
|
|      +- :M:D:Node ---+
|                      +- :M:D:Node:Null
|                      +- :M:D:Node:firewall
|                      +- :M:D:Node:Clients
|  206                 +- :M:D:Node:VPN
|   )                  +- :M:D:Node:WAN
|   ↙
+- :D -+
       |
       +- :D:Redir -+
                    +- :D:Redir:Masquerade:S  (WAN)  => :X:Masquerade
                    +- :D:Redir:SLBSNAT:S     (VPN)
```

*FIG. 2B*

DYNAMICALLY ADAPTIVE NETWORK FIREWALLS AND METHOD, SYSTEM AND COMPUTER PROGRAM PRODUCT IMPLEMENTING SAME

CROSS-REFERENCE TO RELATED APPLICATIONS

This application is a continuation of U.S. patent application Ser. No. 12/579,566, filed Oct. 15, 2009, now U.S. Pat. No. 8,032,933, issued on Oct. 4, 2011, entitled "DYNAMICALLY ADAPTIVE NETWORK FIREWALLS AND METHOD, SYSTEM AND COMPUTER PROGRAM PRODUCT IMPLEMENTING SAME," which is a continuation of U.S. patent application Ser. No. 11/076,719, filed Mar. 10, 2005, issued on Oct. 27, 2009 as U.S. Pat. No. 7,610,621, entitled "SYSTEM AND METHOD FOR BEHAVIOR-BASED FIREWALL MODELING," which claims priority from Provisional Application No. 60/551,698, filed Mar. 10, 2004, entitled "SYSTEM AND METHOD FOR BEHAVIOR-BASED FIREWALL MODELING." This application also relates to U.S. patent application Ser. No. 10/683,317, filed Oct. 10, 2003, now U.S. Pat. No. 8,117,639, issued on Feb. 14, 2012, entitled "SYSTEM AND METHOD FOR PROVIDING ACCESS CONTROL," and Provisional Application No. 60/551,703, entitled "SYSTEM AND METHOD FOR PROVIDING A CENTRALIZED DESCRIPTION/CONFIGURATION OF CLIENT DEVICES ON A NETWORK ACCESS GATEWAY," filed Mar. 10, 2004. All applications referenced herein are hereby fully incorporated by reference.

TECHNICAL FIELD

Embodiments disclosed herein relate generally to network firewall designs and methodologies and more specifically to network firewalls that can dynamically adapt to changing conditions and operator requirements.

BACKGROUND

The communication of data over networks has become an important, if not essential, way for many organizations and individuals to communicate. The Internet is a global network connecting millions of computers using a client-server architecture in which any computer connected to the Internet can potentially receive data from and send data to any other computer connected to the Internet. The Internet provides a variety of methods in which to communicate data, one of the most ubiquitous of which is the World Wide Web. Other methods for communicating data over the Internet include e-mail, usenet newsgroups, telnet and FTP.

Users typically access the Internet either through a computer connected to an Internet Service Provider ("ISP") or computer connected to a local area network ("LAN") provided by an organization, which is in turn connected to an ISP. The network service provider provides a point of presence to interface with the Internet backbone. Routers and switches in the backbone direct data traffic between the various ISPs.

As the number of networked devices has increased, so too has the amount and nature of network traffic. One unfortunate side effect is the evolution of destructive or unauthorized access to the data or operations of networked devices. As a result, technological advances have produced a general class of network service known as a "firewall", which can block or limit access to computers, networks and services "inside" the firewall, from access by any network devices "outside" the firewall. Representation of "inside" and "outside" a firewall is analogous to physical security and protection, where something "inside" is protected from something "outside". Hence, firewall technology and services normally have one network interface connected to the general internet or an unprotected segment of any network and the protected computer and network assets are located behind another network interface controlled by the firewall that is a different, protected network segment.

Typically, network firewalls are configured in a static manner, wherein the firewall's configuration is established and changes infrequently.

Firewalls are potentially complicated structures that are generally maintained manually by a skilled professional. Firewall owners must therefore limit themselves to simple and inflexible features provided by typical network applications/devices, or they must invest in professionals who are skilled enough to construct and maintain firewalls to their specifications. In other words, the skilled firewall professional provides the intelligence, decision-making and flexibility that is lacking in static firewall technology.

Previous firewall implementations are typically limited in two ways: (1) they are embedded in an inflexible hardware platform with no ability to expand and/or (2) they offer only a very simple set of user-visible features both because they have no expandability and because they lack the conceptual model to express more advanced features in a way that is convenient for customers to use. These solutions are inadequate because they limit the power of the features available to customers.

While statically configured firewalls serve a purpose for protecting static network and computing assets, the ability to dynamically reconfigure firewalls in a changing network environment represents a significant evolutionary step in network firewall technology. Dynamic firewalls can monitor transient network client connections and adjust themselves to optimally serve and protect a dynamically changing network client population on both "sides" of a firewall.

SUMMARY

Embodiments disclosed herein expose a conceptual model of firewall structure that makes it far easier to construct an automated system to bridge the gap between the desires of users and the technical implementation of those desires.

One embodiment of the automated system provides a new level of flexibility including, but not limited to, dynamically adding new network interface abstractions or groupings of interface abstractions and tailoring the behavior of those abstractions to the network client devices' specific needs. The automated system enables the firewall owner to generally describe how the firewall should behave, and the automated system can automatically produce the requisite, specific firewall configuration, without detailed manipulation by a human operator.

One embodiment models sources and destinations of network traffic (e.g., client, Virtual Private Network, and Wide Area Network-side devices) as "nodes" that exhibit particular sets of behaviors. Network interface devices (including virtual devices) can then be associated with one of the nodes and assigned the same behaviors/rules as all other devices in that particular node. In this way, the data flows between devices can be monitored and controlled according to the behaviors and rules of each device.

Another embodiment extends the aforementioned behavior description and configuration to modeling the connections between nodes and not just the devices (virtual or physical) of a particular node. That is to say, not only do the devices belonging to a node can exhibit particular behaviors, but the connections between each node can also exhibit particular behaviors.

Another embodiment defines a conceptual framework of the firewall and elucidates the flow of traffic through the gateway and provides a level of abstraction that can be understood and manipulated by human operators to tailor the system's behaviors to their needs.

Another embodiment enables the firewall to react dynamically to important changes such as, but not limited to, the addition or removal of physical or virtual network interfaces. This can be especially important for certain applications because the embodiment permits the deployment of unsophisticated, general implementation technologies (i.e., off-the-shelf hardware) and does not require a custom hardware platform.

BRIEF DESCRIPTION OF THE DRAWINGS

A more complete understanding of the invention and the advantages thereof may be acquired by referring to the following description, taken in conjunction with the accompanying drawings in which like reference indicates like features and wherein.

DETAILED DESCRIPTION

Figure 1:
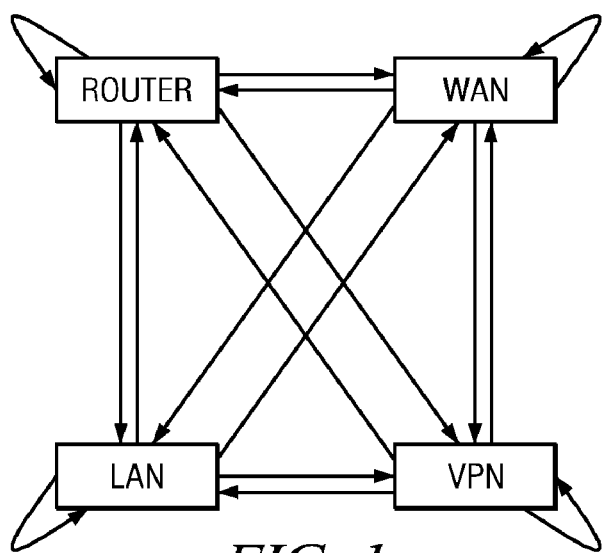
FIG. 1 illustrates a set of nodes for a firewall model.

The following applications are hereby fully incorporated by reference herein in their entirety: U.S. application Ser. No. 10/683,317, filed Oct. 10, 2003, pending, entitled "SYSTEM AND METHOD FOR PROVIDING ACCESS CONTROL"; Provisional Application No. 60/551,698, filed Mar. 10, 2004, entitled "SYSTEM AND METHOD FOR BEHAVIOR-BASED FIREWALL MODELING"; Provisional Application No. 60/551,754, filed Mar. 10, 2004, entitled "SYSTEM AND METHOD FOR COMPREHENSIVE CODE GENERATION FOR SYSTEM MANAGEMENT," which converted into U.S. application Ser. No. 11/078,223, filed Mar. 10, 2005, entitled "SYSTEM AND METHOD FOR COMPREHENSIVE CODE GENERATION FOR SYSTEM MANAGEMENT," issued as U.S. Pat. No. 7,509,625; Provisional Application No. 60/551,703, filed Mar. 10, 2004 entitled "SYSTEM AND METHOD FOR PROVIDING A CENTRALIZED DESCRIPTION/CONFIGURATION OF CLIENT DEVICES ON A NETWORK ACCESS GATEWAY"; Provisional Application No. 60/551,702, filed Mar. 10, 2004, entitled "SYSTEM AND METHOD FOR ACCESS SCOPE CONTROL ("WALLED GARDENS") FOR CLIENTS OF A NETWORK ACCESS GATEWAY," which converted into U.S. application Ser. No. 11/076,591, filed Mar. 10, 2005, pending, entitled "METHOD AND SYSTEM FOR CONTROLLING NETWORK ACCESS"; Provisional Application No. 60/551,699, filed Mar. 10, 2004, entitled "SYSTEM AND METHOD FOR DYNAMIC BANDWIDTH CONTROL"; Provisional Application No. 60/551,697, filed Mar. 10, 2004, entitled "SYSTEM AND METHOD FOR DETECTION OF ABERRANT NETWORK BEHAVIOR BY CLIENTS OF A NETWORK ACCESS GATEWAY," which converted into U.S. application Ser. No. 11/076,652, filed Mar. 10, 2005, issued as U.S. Pat. No. 7,590,728, entitled "SYSTEM AND METHOD FOR DETECTION OF ABERRANT NETWORK BEHAVIOR BY CLIENTS OF A NETWORK ACCESS GATEWAY"; Provisional Application No. 60/551,705, filed Mar. 10, 2004, entitled "SYSTEM AND METHOD FOR DOUBLE-CAPTURE/DOUBLE-REDIRECT TO A DIFFERENT LOCATION," which converted into U.S. application Ser. No. 11/076,646, filed Mar. 10, 2005, issued as U.S. Pat. No. 7,665,130, entitled "SYSTEM AND METHOD FOR DOUBLE-CAPTURE/DOUBLE-REDIRECT TO A DIFFERENT LOCATION"; Provisional Application No. 60/551,704, filed Mar. 10, 2004, entitled "SYSTEM AND METHOD FOR NETWORK MANAGEMENT XML ARCHITECTURAL ABSTRACTION," which converted into U.S. application Ser. No. 11/076,672, filed Mar. 10, 2005, abandoned, entitled "SYSTEM AND METHOD FOR NETWORK MANAGEMENT XML ARCHITECTURAL ABSTRACTION"; and Provisional Application No. 60/551,703, filed Mar. 10, 2005, entitled "SYSTEM AND METHOD FOR PROVIDING A CENTRALIZED DESCRIPTION/CONFIGURATION OF CLIENT DEVICES ON A NETWORK ACCESS GATEWORK."

The invention considers the firewall as implemented within a device, service or server at the nexus of two network segments but, at a conceptual level, it appears more like any other network traffic origination or destination device; i.e., while the functional aspects of a firewall may differentiate itself from other network infrastructure devices or services, at a conceptual level it inspects, marks, prioritizes and routes traffic similar to other network packet handling service.

Embodiments disclosed herein seek to abstract the diverse set of network and firewall operations into a generalization of activities amongst "nodes" in the firewall model. With a basic conceptual model, all firewall behavior can be characterized as high-level operations on network traffic flowing through the firewall.

The firewall is the nexus in a fully-interconnected graph (FIG. 1) with four nodes. Each node in FIG. 1 is simultaneously a source of and destination for network packets. Packets travel between nodes over intra-firewall connections within the firewall model. Implementations of intra-firewall connections can be software, in-memory implementations or can be hardware, signaling implementations. A non-limiting example of a software, in-memory implementation can be realized through a computer program product comprising a computer readable storage medium storing computer program code executable by a computer. As one of ordinary skill in the art can appreciate, a computer memory is a non-limiting example of a computer readable storage medium.

There are three essential stages to a packet's journey through the firewall model:

Arriving, node-specific behaviors. Where network traffic is inspected upon arrival at a node in the firewall model and the model acts upon this traffic, based on its configuration at the time of the traffic arrival and the processing node's capabilities.

Connection-specific behaviors. Some behaviors are contextually important when considered as part of a connection between two nodes in the firewall model. When network traffic flows over the connection it can be inspected and handled at one or both of the node endpoints of the connection.

Departing, node-specific behaviors. Where network traffic is inspected prior to departure from a node and the firewall acts upon this traffic, based on its configuration at the time of the traffic departure and the processing node's capabilities.

Embodiments disclosed herein can employ existing operating system mechanisms to implement the concepts. For example, the Linux operating system has a subsystem known as "iptables" (for Internet Protocol Tables) that offers a "rule" syntax for representing the logic of packet handling through the Linux system.

As illustrated in FIG. 2, and described below, the firewall employs dynamic chains of rules (serialized sequences of one or more rules) to "tap" into the main firewall chains and offer isolated, well-defined places for specific behavior to be introduced. One reason for functional extensions is to enrich the firewall rule predicate or antecedent functionality to provide more functionality as domain-specific applications require or as general network technology evolves.

To dynamically integrate devices or interfaces, the firewall defines the following objects:

Device—Represents a source or sink of network traffic. In the firewall conceptual framework, a "device" can be mapped to a physical device or network interface, or it can be mapped to a virtual device; e.g., a virtual private network (VPN) is an abstraction of routes, keys and permissions that represent a virtual network segment, the firewall can manipulate the facets of a VPN through a VPN device in the firewall abstraction nomenclature. Devices always belong to nodes when they are active.

Chain—Represents a list of one or more firewall rules. A firewall rule has the normal predicate/antecedent format, where elements of the predicate must match before the actions of the antecedent are enacted. Chains of firewall rules are linear and serial, as the name implies.

Node—Could be any one of the nodes represented in FIG. 1. A Node can have any number of Services or Devices.

Service—Represents a node-specific or connection-specific behavior. A service may be a collection of atomic behaviors that are cohesive in their functionality and represent a larger piece of utility to the system. Any node or connection may have one or more services.

When a new device is introduced to the firewall system, a new Device object is created and placed in the Null node, which has no services (behaviors) and is not connected to any other node. The new device is then moved to the Node to which it belongs. A Device can be moved from one node to another. The process of "moving" a device from one node to another deletes existing behaviors and states and associates new ones.

When a device is deleted from the system, its Device object is moved to the Null node and then left to die (e.g., at object cleanup). In one implementation, a Java Virtual Machine provides garbage collection for null-ed firewall objects.

Connections between nodes, as represented in FIG. 1, are also created dynamically and can migrate or redefine their endpoints as the firewall system deems necessary.

Figure 3:
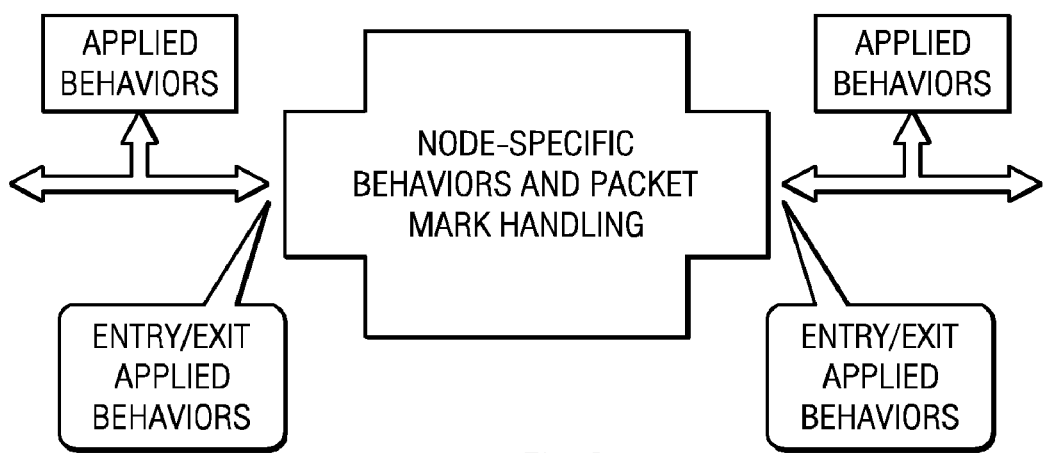
FIG. 3 illustrates aspects of behaviors applied to packet traversal through the firewall model.

One of the strengths of the firewall is its careful identification and segmentation of traffic flows. Each such flow is represented by the concept of a connection between nodes. Just as nodes have behaviors, so do connections. Some of the transformations applied to a packet depend entirely on the node through which the packet arrives or departs. Additional transformations can be associated with the connection through which the packet travels, without regard to the nodes between which the packet is traveling. FIG. 3 illustrates the salient aspects of behaviors applied to packet traversal through the firewall model. Thus, in a generic and customizable way, basic facilities can be adjusted by tailoring the specific behaviors of the various connections.

One important example of this is the connection between the Clients node and the WAN node. Packets that bear the mark of a client that is authorized to use the WAN connection are permitted to flow along this connection and arrive at the WAN node. Packets from clients that don't have this authorization are blocked. Network communications port blocking is typically a Client-specific behavior; i.e., in this embodiment's conceptual model, port blocking is germane only to network client device traffic and, hence, network port blocking is only considered when network client traffic is considered (i.e., traffic from the client node).

Network port forwarding is specific to the connection from the WAN node to the Clients node. In other words, packet processing is performed based on rules associated with the connection rather than the nodes. The nature of network port forwarding is that "outside" traffic—meaning, network traffic originating on the outside of the firewall, from the Wide-Area Network—will be addressed to a particular port as received by the firewall, whereupon the firewall will pass that network traffic, but may change the port as seen by the packet destination device.

Network Address Translation (NAT), is a WAN-specific behavior. NATed network packets have source and/or destination addresses translated to/from an internal network address that is not publicly available on the general network (or Internet). NATing is a mechanism for employing a single, public Internet Protocol Address (IPADDR) to represent a number of client devices behind a NATing service. NATed packets present a slightly different form of forwarding problem for firewalls, but it is akin to port forwarding or port translation, as the firewall must maintain a state table to keep track of NATed addresses or translated ports.

Every packet that arrives at the firewall receives a 32-bit mark (or other mark depending on implementation) that identifies how that packet is attributed. This is fundamental to accounting and authorization models, where network client traffic must be tracked. The firewall uses marks to, among other things, decide if packets are permitted to reach their destinations.

Figure 2A:
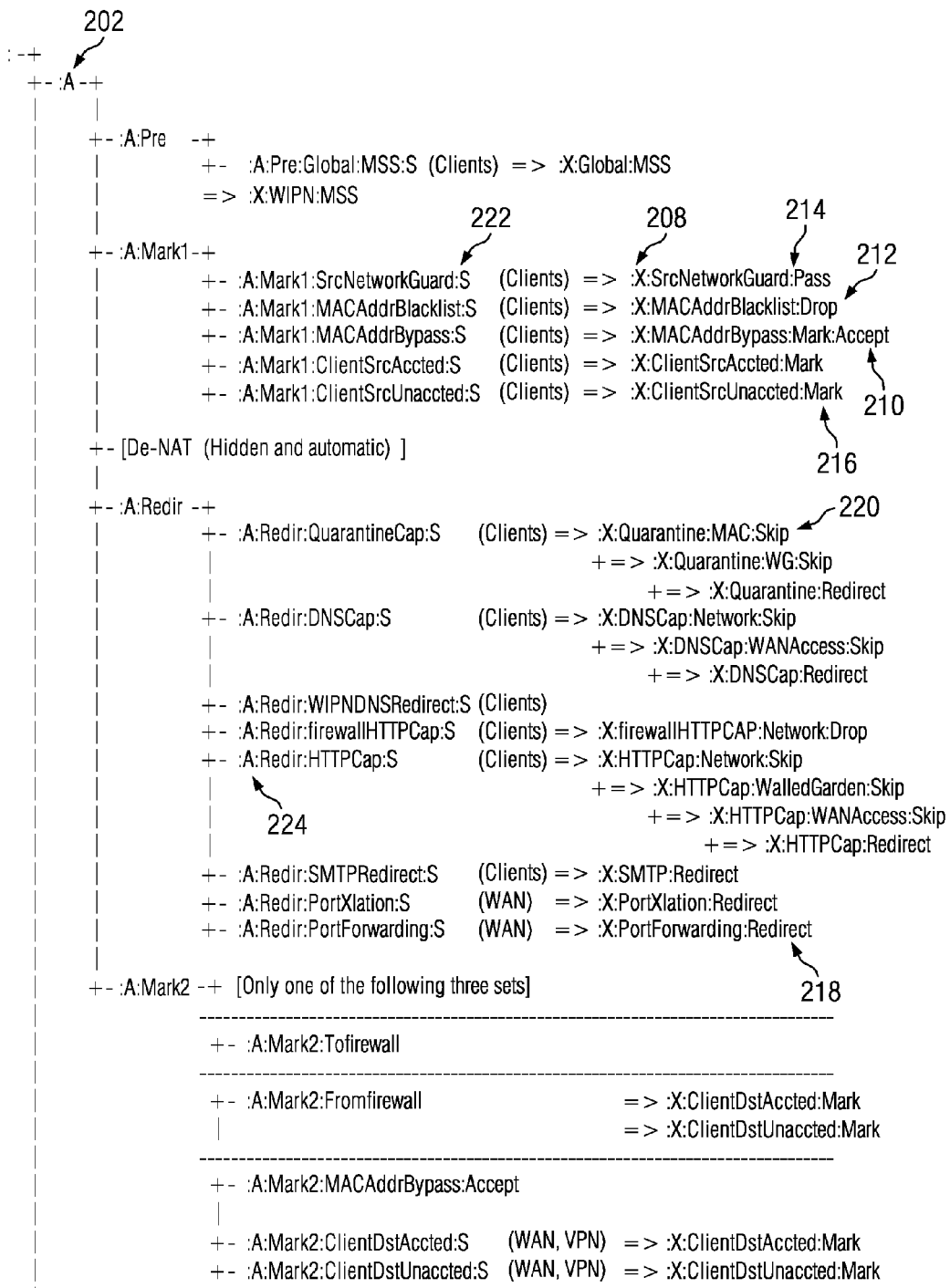
FIG. 2 illustrates a set of firewall rules.

FIG. 2 illustrates the experience of a network packet as it travels through the firewall from its arriving node to its departing node. FIG. 2B is an extension of the tree graph of FIG. 2A as indicated. The path the tree graph takes is a depth-first, in-order traversal of the tree depicted in FIG. 2. In FIG. 2, the node (clients) corresponds to the defined nod LAN in FIG. 1.

To help reflect the structure of the firewall, rule chains are given names in a hierarchical name space. Immediately below the root are subtrees with names "A", "M", "D" and "X". These character identifiers provide a namespace separate for rules governing the firewalls behavior.

Rule chains essentially represent predicate/antecedent rule logic and can be classified as classic production rules systems as known in the Artificial Intelligence community. The tree nodes of a rule chain is a specific representation of a more general Boolean logic structure where each node in a chain tree that is traversed represented AND'd predicate logic in Boolean form. Additionally, exits from a rule chain (i.e., reaching leaf nodes) or jumps to other rule chains represent the antecedent portion of the rule.

Said differently, rule chains represent classic "If-Then" logic, as might be supported by the syntax of a software programming language.

FIG. 2 illustrates a representative set of firewall rules that handles NAT'd, MASQUERAD'd, VPN'd, port blocked, port forwarded and client authenticated traffic. While not an exhaustive list of firewall capabilities, these firewall functions are relatively standard and basic capabilities that can be found in most firewall implementations. These basic capabilities serve as an example from which to explain the dynamic firewall rule chain logic and are not meant to be an exhaustive or limiting list of capabilities. One main embodiment of the invention is the ability to dynamically extend, prune or otherwise modify these firewall rule chain sets as functional requirements or the network operating environment changes.

The arriving (:A) sub-tree (represented at 202) prepares packets to enter the matrix. This is where packets are marked, de-NATed (if Network Address Translation has occurred), de-MASQUERADEd and redirected. Since the purpose of this sub-tree is packet "conditioning", its rules only change network packets, and do not drop or accept them. Along with the :D sub-tree (see below), these rules implement the behaviors of nodes.

In the rule chain represented by 218, the antecedent portion of the :A rule chain redirects a network packet based on a port forwarding rule. Specifically, this rule (218) rewrites a portion of the network packet header, either changing the destination address or port, so that the packet arrives at an alternate location, once the packet departs the firewall, than originally addressed. In this example, the packet header contents are modified as a result of this :A rule chain.

In the :A rule chain represented by 224, a packets protocol is detected and "captured", before a determination is made as to where the packet may next proceed. This particular rule chain represents a common manner for capturing unauthorized network clients and either forcing them to authenticate themselves (usually against an authentication server like LDAP) or simply redirecting them to a constrained location on the network where their ability to view network resources is limited.

It is important to note, at this point, that the rule chains represented by FIG. 2 are composite rules chains of the entire firewall model and do not describe rule chains at any particular node or attached to any particular inter-node connection. For certain rules, especially those annotated as departing to or arriving from Clients or the WAN, there are likely logically constrained attachment points so that they work properly; e.g., A: chains dealing with incoming Client packets are likely attached to the LAN interface (logical, physical or virtual), since network Clients connect to a firewall via the LAN interface. Attachment points for other rule chains may be deferred to implementation details, based on the implementation technology or optimization requirements (speed, memory or cost).

In the matrix (:M) sub-tree (represented at 204), packets are routed through different chains depending on their source and destination nodes. The main purpose of this sub-tree is to decide if packets deserve to arrive at their destination, so the rules in this sub-tree only accept or drop packets, not change them. These rules implement the behaviors of the connections between nodes. More specifically, :M chains can be attached to the incoming/outgoing interfaces of nodes themselves, or attached to the inter-node connections.

The departing (:D) sub-tree (represented at 206), post-processes packets that have successfully navigated the matrix. Packets that arrive here deserve to be transmitted, so the rules in this sub-tree only change packets, not drop or accept them. This is where packets are NATed and MASQUERADEd. Along with the :A sub-tree, these rules implement the behaviors of nodes. :D chains are normally associated with nodes that have interfaces (logical, physical, virtual) with network segments outside of the firewall model.

The :X subtree contains chains that are compact, well-identified places where rules can be inserted and deleted dynamically. Packets arrive at these chains from well-identified "taps" in the main pathway. These taps are indicated throughout FIG. 2 by "=>" pointing at the name of the :X chain that will receive packets. This is shown, for example, at 208. :X chains exist for extensibility and may be provided, a priori, as part of the firewall implementation or may be dynamically loaded as part of a firewalls configuration or runtime reconfiguration.

In any tree structure, there are ultimately "leaves" of the tree, from which there are no child nodes. FIG. 2 demonstrates leaf chains, which have suffixes that indicate how they behave. ":Accept" chains, such as that represented at 210, have rules with ACCEPT targets. When a packet matches an ACCEPT target, the packet immediately jumps out of the current sub-tree, and moves to the next. Accept chains are useful for forming Boolean OR constructs. For example, the following series of rules might appear in a chain that needs to accept packets that match any of the tests "A", "B" or "C", each of which are implemented in their own chain. As an example, the "iptables" utility available from the Linux Operating System environment uses the following syntax to enable rules:

iptables -t filter -A ExampleChain -j TestA:Accept
iptables -t filter -A ExampleChain -j TestB:Accept
iptables -t filter -A ExampleChain -j TestC:Accept According to one embodiment, the default policy in the :M sub-tree is DROP. That is, if a packet traverses the entire :M sub-tree and never matches an ACCEPT target, it will be dropped.

":Drop" chains, such as that represented at 212, have rules with DROP targets. When a packet encounters a DROP target, it is discarded and will never be delivered to its destination.

":Pass" chains, such as that represented at 214, have rules with RETURN targets, and a single DROP target at the end. A RETURN target causes the packet to jump out of the current chain and resume its path through the "calling" chain. Each rule other than the final DROP describes a packets that should be "passed" on to further processing. Packets that match none of the RETURN rules encounter the DROP rule and are discarded. Since the DROP target in a pass chain must stay at the end of the chain, new rules, according to one embodiment, must be inserted, rather than appended.

Pass chains are useful for forming Boolean AND constructs. For example, the following series of rules might appear in a chain that needs to pass only packets that match all the tests "A", "B" and "C", each of which are implemented in their own chain. As an example, the "iptables" utility available from the Linux Operating System environment uses the following syntax to enable rules:

iptables -t filter -A ExampleChain -j TestA:Pass
iptables -t filter -A ExampleChain -j TestB:Pass
iptables -t filter -A ExampleChain -j TestC:Pass ":Mark" chains, such as that represented at 216, have rules with MARK targets. These rules write packet marks according to various criteria. These chains appear only in the :A sub-tree because packets must be accounted for as soon as they arrive.

":Redirect" chains, like that shown at 218, have rules with REDIRECT targets. These rules usually change a packet's destination address and/or port.

":Skip" chains (e.g., shown at 220) are like pass chains, these chains have rules with RETURN targets. Unlike pass chains, skip chains have something other than a DROP target at the end. Each rule other than the final one describes packets that should skip whatever processing the final rule offers. Packets that match none of the RETURN rules are processed by the final rule. Since the final rule must stay at the end of the chain, new rules, according to one embodiment, must be inserted, rather than appended.

":S (:J)" chains are "services" (described below). The names of nodes that subscribe to a service are shown in parentheses after the chain. For each :S chain (e.g., shown at 222), there is a :J chain that is not shown.

A "service" is a set of rules that operate on packets in a very specific way (e.g., masquerading outgoing packets, or capturing incoming packets). Every service has two chains. The first chain has a name ending with :S. This chain appears in the packet pathway in a specific place and is guaranteed to see all packets flowing through the firewall. The second chain has a name ending with :J and contains the rules that actually implement the service. Packets that need the service are directed through the second chain by a "jumper" in the first chain. This is analogous to a hardware jumper used to enable a feature.

For example, HTTP requests arriving from the Clients node must be captured if the given client is not authorized. Thus, the :A:Redir:HTTPCap:S (shown at 224) can contain a rule that causes packets coming from eth0 to the :A:Redir:HTTPCap:J chain. The rules in the :A:Redir:HTTPCap:J chain arrange for the capture of unauthorized packets.

One example of Mark Space Allocation employs a 32-bit number that travels with the packet when it's in the system—it is lost as soon as the packet enters a device. Marks can be read and written by rules in the firewall. They can also be read (but not written) by the routing and bandwidth control systems. Thus, firewall rules can be used to control how packets are routed and scheduled for transmission.

It can be noted from FIG. 2 that rules can be applied to nodes or connections between nodes. For example, rule 208 is applied to the node "clients" (represented by the (clients) in the rule). A rule associated with the clients node will be applied to packets to/from devices or services associated with the clients node in the firewall model. Rules can also be associated with connections. For example, for the chain shown in FIG. 2B:

M:X:WAN-x-Clients =>:X:Network:Accept
    =>:X: PortForwarding:Accept
    =>:X: PortXlation:Accept The rules are applied to packets flowing on the connection between the WAN node and the clients node.

When a packet arrives at the firewall, it is automatically assigned a mark of zero (the "unmarked" mark). As quickly as possible, the firewall attempts to assign a mark that attributes the packet to whichever party is best accountable for it. This is important for two reasons:

It tells the firewall, bandwidth control and routing systems how to treat a packet. For example, priority channel packets are passed immediately by the firewall, and then transmitted by the bandwidth control system as soon as they arrive. Packets with client marks are passed conditionally, depending on whether or not the owning client has the proper authorization, and then scheduled for transmission by the bandwidth control system in accordance with the client's provisioning.

It also tells the firewall how to account for a packet. In order for the firewall to send proper accounting reports, it must be able to match a packet to a client or other accounting entity. When the firewall marks a packet, it enables the firewall to do this.

The table below shows one embodiment of how the mark name space is allocated:

| Mark (hex) | Description |
|---|---|
| 0000 | Unmarked |
| 0001-0fff | RESERVED |
| 1xxx | System traffic marks (4K marks) |
| 1000 | Unattributed |
| 1001 | Firewall |
| 1002 | VPN |
| 1003-1fff | RESERVED |
| 2xxx | Static clients (4k marks) |
| 3xxx | Dynamic clients (4k marks) |
| 4000-fffe | Per-IP Bandwidth Control |
| Ffff | MAC address bypass |

The mark ranges are in order of numerical value, but are also in order of "mark priority". For example, a dynamic client mark has a higher priority than the firewall mark. This is why a packet traveling from a client to the firewall merits both marks, but will receive the client's mark. Notice that the priority channel has the highest priority mark. This means that packets from a client that travels over the priority channel will be attributed to the priority channel—not the client from which it came.

All packets get "0x0000" mark automatically when they enter the firewall. A packet will receive a more informative mark if it can be attributed. These packets have limited permission to travel through the firewall and are very susceptible to being captured.

The "0x1xxx" range (where xxx is a 3-digit hexadecimal range from 000 to fff) is used to mark packets that cannot be specifically attributed with a higher mark, but can be identified by the node to/from which they are traveling. Currently, there are only two marks in this range: firewall and VPN. There is no Clients mark because all packets traveling to/from the Clients node are given the appropriate client mark. There is no WAN mark because all packets traveling to/from the WAN node are given other marks.

An important use for this range is exemplified by the VPN mark. When packets depart through the ipsec0 pseudo-device, they generate new packets that emerge from the firewall and leave through the physical eth1 device. Thus, tunneled VPN traffic competes with clients and other elements of the system to consume bandwidth on the eth1 device. For that reason, these packets must be marked so they can be accounted for.

According to one embodiment, new nodes can be dynamically generated for new pseudo-devices that, like the VPN, will generate packets that must flow out through a physical device. Each such node will be allocated a mark from this range. :D rule chains implement packet handling for pseudo devices as the packets depart the firewall.

Packets receive the "0x1000" firewall mark if they are arriving from or destined for the firewall and do not already have a higher-priority mark.

Packets receive the "0x1001" VPN mark if they are carrying tunnel traffic for a VPN node.

Marks for static clients are allocated from the "0x2xxx" range (where xxx is the hexadecimal range 000 to fff). Notice that this is a lower priority range than dynamic clients. That is, if a packet merits both a static and dynamic client mark, it will receive the dynamic client mark.

Marks for dynamic clients are allocated from range 0x3xxx, where xxx is the hexadecimal range 000 to fff.

The "0xfxxx" range is used to mark packets belong to various unaccounted categories.

The mark "0xf000" applies to packets that qualify for MAC Address Bypass.

The "0xffff" mark applies to packets in the priority channel.

Packets departing from the router node receive marks in this order:
   Apply a client's mark to packets departing through a device owned by the client.
   Apply a client's mark to packets with a destination IP address owned by the client.
   For any packets that don't yet have a mark:
   Apply the VPN mark to unmarked IPv6-Crypt protocol packets.
   Apply the firewall mark to unmarked packets.

If the packet can be attributed to a network client, it will be. Otherwise, it will be attributed to the firewall. Since the firewall doesn't participate in VPN tunnels with clients, the VPN mark will never apply.

VPN tunnel traffic will be IPv6-Crypt protocol, and will receive the VPN mark. All other traffic will receive the firewall mark.

Packets destined for the router node receive additional marks in this order:
   Apply the VPN mark to unmarked IPv6-Crypt protocol packets.
   Apply the firewall mark to unmarked packets.

Packets arriving from the Clients node receive marks in this order:
   Apply a client's mark to packets arriving from a device owned by the client.
   Apply a client's mark to packets with a source IP address owned by the client.
   Apply the MAC address bypass mark to qualifying packets.
   Apply the priority channel mark to qualifying packets.
   Apply additional marks in this order:
   Apply the VPN mark to unmarked IPv6-Crypt protocol packets.
   Apply the firewall mark to unmarked packets.

Packets arriving from the VPN node receive marks in this order:
   Apply a client's mark to packets departing through a device owned by the client.
   Apply a client's mark to packets with a destination IP address owned by the client.
   Apply additional marks in this order:
   Apply the VPN mark to unmarked IPv6-Crypt protocol packets.
   Apply the firewall mark to unmarked packets.

Client marks, according to one embodiment, will never apply to this traffic. Tunnel within tunnel traffic will receive the VPN mark, just like tunnel traffic through the WAN node. All remaining traffic will receive the firewall mark.

Packets arriving from the WAN node receive marks in this order:
   Apply a client's mark to packets departing through a device owned by the client.
   Apply a client's mark to packets with a destination IP address owned by the client.
   Apply additional marks in this order:
   Apply the VPN mark to unmarked IPv6-Crypt protocol packets.
   Apply the firewall mark to unmarked packets.

According to one embodiment, client marks will never apply to this traffic. Tunnel traffic will receive the VPN mark. All remaining traffic will receive the firewall mark.

If the packet can be attributed to a client, it will be. Otherwise, it will be unmarked. Note that port forwarded and port translated traffic that is not directed at a specific client will be unmarked. One way to insure that this traffic is marked and accounted for would be to set up a static client.

One embodiment includes a conceptual model representing a network firewall that separates firewall functionality into individually configurable and controllable components.

Another embodiment includes the conceptual model, wherein the hardware or component technology used to host a firewall model's implementation is indistinct from commercial off-the-shelf components and, therefore, the firewall is driven by a dynamically reconfigurable implementation of the firewall model. A non-limiting example of a dynamically reconfigurable implementation of the firewall model can be realized through a computer program product comprising a computer readable storage medium storing computer program code executable by a computer. One of ordinary skill in the art can appreciate that many suitable computer readable storage media exist.

Yet another embodiment includes a conceptual model, where a set of firewalls can be dynamically reconfigurable and managed as a cohesive group of firewall nodes in a network implementation comprised of several LAN and WAN segments needing firewall protection. In a system of firewalls, each protecting a separate network segment, system-wide policies can be implemented by downloading identical sets of rule chains to each firewall, as a representation of common firewall configurations. It may also be desirable to "clone-n-hone" firewall configurations, which occurs with a common rule chain configuration is provided to each firewall in a system of firewalls and individual firewalls receive localized customizations, tailoring their behavior to the needs of a particular network segment. Localized rule chain modifications make it possible to extend/modify an individual firewall's behavior, based on a general behavior policy.

According to one embodiment, the firewall behaviors can be described as predicate/antecedent rule logic acting upon dynamic data from both the configuration space of the firewall as well as changing network state and client connectivity. The rule chain predicates ("If" portions of a rule) act on data that is potentially available from multiple sources:
   Configuration data of the firewall (e.g., its Internet Protocol Address, its local identification string, the version of the firewall rule chain set, etc.)
   Data arriving in the network packet itself (e.g., the origination or destination address, the protocol, portions of the payload data, etc.)
   Data available through firewall extensions (:X rule chains) that may be monitoring network traffic flows for activity spikes or lulls or, perhaps, a device monitoring extension that polls a timer or instrumentation device for time-sensitive data.

While the invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method for controlling data through a firewall performed on at least one data controlling computer having computer instructions stored on at least one non-transitory computer readable medium, comprising:
   defining at least one node, wherein the at least one node is associated with two or more network interfaces;
   associating a set of firewall rules with the at least one node;
   receiving a packet at a first node of the at least one node; and accepting or denying the packet based on the set of firewall rules, wherein the set of firewall rules is dynamically self-configurable during runtime without operator interaction, wherein the set of firewall rules comprises a plurality of chains of rules forming various paths through a hierarchical structure, and wherein the hierarchical structure comprises defined places for dynamically updating the set of firewall rules during runtime.

2. A method according to claim 1, wherein dynamically updating the set of firewall rules during runtime further comprises, during runtime, adding a rule to the set of firewall rules, deleting a rule from the set of firewall rules, or modifying a rule in the set of firewall rules without operator interaction.

3. A method according to claim 1, wherein associating the set of firewall rules with the at least one node further comprises associating a first subset of the set of firewall rules with the first node.

4. A method according to claim 3, wherein the at least one node further comprises at least two nodes including a second node, further comprising associating a second subset of the set of firewall rules with the second node.

5. A method according to claim 4, wherein the first subset of firewall rules is the same as or at least partially different from the second subset of firewall rules.

6. A method according to claim 4, wherein one of the first subset of firewall rules or second subset of firewall rules equals the entire set of firewall rules.

7. A method according to claim 1, further comprising, after receiving the packet and prior to accepting or denying the packet, conditioning the packet based on the set of firewall rules.

8. A method according to claim 7, wherein conditioning the packet based on the set of firewall rules further comprises rewriting a portion of a network packet header associated with the packet.

9. A method according to claim 1, wherein each of the at least one node is associated with at least two network interfaces.

10. A method according to claim 1, wherein each of the two or more network interfaces is connected with at least one physical device.

11. A method according to claim 1, wherein the set of firewall rules being dynamically self-configurable further comprises dynamically updating the set of firewall rules during runtime without operator interaction.

12. A device for controlling data through a firewall, comprising:
a plurality of network interfaces, wherein each of the plurality of network interfaces is operable to utilize one or more physical devices;
a first computer readable storage medium storing a set of firewall rules, wherein the set of firewall rules is dynamically self-configurable during runtime without operator interaction, wherein the set of firewall rules comprises a plurality of chains of rules forming various paths through a hierarchical structure, and wherein the hierarchical structure comprises defined places for dynamically updating the set of firewall rules during runtime without operator interaction;
a data controlling computer program comprising data controlling computer program code stored on either the first computer readable storage medium or on a second computer readable storage medium, the data controlling computer program code being executable to:
define at least one node, wherein the at least one node is associated with two or more network interfaces of the plurality of network interfaces; and
when a packet is received at one of the two or more network interfaces associated with the at least one node, accept or deny the packet based on a review of the set of firewall rules.

13. A device according to claim 12, wherein the data controlling computer program code is further executable to, while the firewall is processing traffic through the at least one node, add a rule to the set of firewall rules, delete a rule from the set of firewall rules, or modify a rule in the set of firewall rules.

14. A device according to claim 12, wherein the at least one node comprises a first node, and wherein the data controlling computer program code is further executable to:
associate a first subset of the set of firewall rules with the first node; and
if the packet is received at the first node, apply the first subset of the set of firewall rules associated with the first node.

15. A device according to claim 14, wherein the at least one node further comprises at least two nodes including a second node, and wherein the data controlling computer program code is further executable to:
associate a second subset of the set of firewall rules with the second node; and
if the packet is received at the second node, apply the second subset of the set of firewall rules associated with the second node.

16. A device according to claim 15, wherein the first subset of the set of firewall rules is the same as or different from the second subset of the set of firewall rules.

17. A device according to claim 15, wherein either the first subset of the set of firewall rules or the second subset of the set of firewall rules equals the entire set of firewall rules.

18. A device according to claim 12, wherein the data controlling computer program code is further executable to condition the packet based on the set of firewall rules.

19. A device according to claim 18, wherein conditioning the packet based on the set of firewall rules further comprises rewriting a portion of a network packet header associated with the packet.

20. A device according to claim 12, wherein each of the at least one node is associated with at least two network interfaces.

21. A device according to claim 12, wherein each of the plurality of network interfaces is connected with at least one physical device.

22. A device according to claim 12, wherein each of the plurality of network interfaces is physically connected to every other network interface of the plurality of network interfaces and
wherein physical connection between the plurality of network interfaces comprises indirect physical connection between the plurality of network interfaces.

23. A device according to claim 12, wherein the data controlling computer program code is further executable to dynamically update the set of firewall rules during runtime without operator interaction.

24. A data controlling computer program product comprising computer instructions stored on at least one non-transitory computer readable medium, wherein the computer instructions are operable when executed by at least one processor to:
define at least one node for controlling data through a firewall, wherein at least one of the at least one node is associated with two or more network interfaces;
associate a set of firewall rules with the at least one node, wherein the set of firewall rules further comprises a plurality of chains of rules forming various paths through a hierarchical structure, and wherein the hierarchical structure comprises defined places for dynamically updating the set of firewall rules during runtime without operator interaction;

receive a packet at a first node of the at least one node; and accept or deny the packet based on a review of the set of firewall rules, wherein the set of firewall rules is dynamically self-configurable during runtime without operator interaction.

25. A data controlling computer program product according to claim 24, wherein the computer instructions are further executable to dynamically update the set of firewall rules during runtime without operator interaction.

26. A data controlling computer program product according to claim 25, wherein the computer instructions are further executable to, while the firewall is processing traffic through the at least one node, add a rule to the set of firewall rules, delete a rule from the set of firewall rules, or modify a rule in the set of firewall rules.

27. A data controlling computer program product according to claim 26, wherein the computer instructions are further executable to:

associate a first subset of the set of firewall rules with the first node; and if the packet is received at the first node, apply the first subset of the set of firewall rules associated with the first node.

28. A data controlling computer program product according to claim 27, wherein the at least one node further comprises at least two nodes including a second node, and wherein the computer instructions are further executable to:

associate a second subset of the set of firewall rules with the second node; and if the packet is received at the second node, apply the second subset of the set of firewall rules associated with the second node.

29. A data controlling computer program product according to claim 28, wherein the first subset of the set of firewall rules is the same as or different from the second subset of the set of firewall rules.

30. A data controlling computer program product according to claim 28, wherein either the first subset of the set of firewall rules or the second subset of the set of firewall rules equals the entire set of firewall rules.

31. A data controlling computer program product according to claim 24, wherein the computer instructions are further executable to condition the packet based on the set of firewall rules.

32. A data controlling computer program product according to claim 31, wherein conditioning the packet based on the set of firewall rules further comprises rewriting a portion of a network packet header associated with the packet.

33. A data controlling computer program product according to claim 24, wherein each of the at least one node comprises at least two network interfaces.

34. A data controlling computer program product according to claim 24, wherein each of the two or more network interfaces is connected with at least one physical device.

35. A data controlling computer program product according to claim 24, wherein each of the two or more network interfaces is physically connected to every other network interface of the two or more network interfaces and wherein physical connection between the two or more network interfaces comprises indirect physical connection between the two or more network interfaces.

* * * * *